UNITED STATES PATENT OFFICE.

FREDRICK LESTER JEFFERIES, OF GRANITE CITY, ILLINOIS, ASSIGNOR TO CORN PRODUCTS REFINING COMPANY, A CORPORATION OF NEW JERSEY.

APPLE JELLY AND METHOD OF MAKING THE SAME.

1,045,849.  Specification of Letters Patent.  Patented Dec. 3, 1912.

No Drawing.   Application filed August 9, 1912.  Serial No. 714,233.

*To all whom it may concern:*

Be it known that I, FREDRICK L. JEFFERIES, a citizen of the United States, residing at Granite City, in the county of Madison and State of Illinois, have invented certain new and useful Improvements in Apple Jelly and Method of Making the Same, of which the following is a specification.

My invention relates to certain improvements in the manufacture of jelly from fruit, such as apples, and particularly from apple trimmings, that is, the skins and cores of apples.

The improvement consists, first, in the removal from the fruit, by an operation hereinafter particularly described, of certain solubles which are valueless and, in fact, a detriment so far as the jelly is concerned, but which, when separated out, have a value of their own in other industries.

The object of the invention may therefore be said to be, first, the improvement in the grade or quality of the jelly, and, second, the saving as the by-product of certain substances which heretofore have been wasted.

In making apple jelly from the trimmings and cores of apples it has been found of advantage to cook the fruit in a closed vessel under steam pressure greater than atmospheric. The pressure usually is from ten to twenty pounds. The cooked fruit is afterward pressed in an ordinary cider or filter press. I have discovered, however, that better results can be obtained if the fruit before being subjected to the cooking step is steeped at a relatively low temperature and the resultant liquor drawn off. I have obtained excellent results in this preliminary steeping at a temperature in the neighborhood of one hundred and sixty degrees Fahrenheit, this, according to my present judgment, being the preferred temperature, but I do not necessarily limit myself to this temperature as lower or higher temperatures may be used provided they do not reach or closely approach the boiling point. The steeping releases or dissolves out from the fruit certain solubles which are of no value so far as the jelly is concerned. In fact the quality of the jelly is improved when these solubles are removed. In addition, the liquor which results from the preliminary steeping has cider properties making it valuable for the manufacture of vinegar or boiled cider. After drawing off this liquor the residue of the fruit is cooked in the ordinary way at a temperature of two hundred twelve degrees Fahrenheit or above. For example, it may be boiled in a closed vessel at a steam pressure of, say, ten to twenty pounds. The jelly is then made from the cooked fruit in the usual manner. That is, the fruit is put through a cider or filter press and the resultant liquor, containing the solubles released at the high temperature, mixed with some sugar-like substance. I have used syrup or sugar made from corn.

I have found that a further improvement can be made in the process by steeping the fruit taken from the press in water. In fact the pressing step may be omitted entirely and the high temperature solubles washed out instead by this steeping operation.

My improved process insures making jelly of superior flavor and of a short, firm consistency as distinguished from jelly which is stringy, sticky or syrupy.

I claim:

1. A jelly made from apple trimmings from which have been removed the solubles capable of being dissolved out by steeping.

2. A jelly made from apple trimmings from which have been removed the solubles capable of being dissolved by steeping in water at a temperature of substantially in excess of one hundred and sixty degrees Fahrenheit.

3. A fruit jelly from the fruit ingredient of which have been removed the solubles which can be dissolved out by steeping.

4. A fruit jelly from the fruit ingredient of which have been removed the solubles which can be dissolved out by steeping in water at a temperature not substantially in excess of one hundred and sixty degrees Fahrenheit.

5. An improvement in the method of making fruit jelly which consists in first steeping the fruit and removing the solubles dissolved out by the steeping process, then cooking the fruit and using the resultant liquor for making the jelly.

6. The improvement in the method of making jelly from apple trimmings which consists in first steeping the fruit and removing the solubles dissolved out by the steeping process, then cooking the fruit and using the resultant liquor for making the jelly.

7. The method of separately removing from apples the substances having cider making properties and those having jellying properties, which consists in first steeping the fruit at a temperature not substantially in excess of one hundred and sixty degrees Fahrenheit and removing the solubles released at this temperature, and then cooking the residue at a temperature of two hundred and twelve degrees Fahrenheit or above.

8. A method of separately removing from apples a substance having cider making properties and those having jellying properties which consists in first steeping the fruit and removing the solubles released at a low temperature and then cooking the residue at a temperature of two hundred and twelve degrees or above.

FREDRICK LESTER JEFFERIES.

Witnesses:
W. S. UNTHANK,
F. M. SAYRE.

---

It is hereby certified that in Letters Patent No. 1,045,849, granted December 3, 1912, upon the application of Fredrick Lester Jefferies, of Granite City, Illinois, for an improvement in "Apple Jelly and Methods of Making the Same," an error appears in the printed specification requiring correction as follows: Page 1, line 87, for the word "of" read *not;* and that the said Letters Patent should be read with this correction therein that the same may conform to the record of the case in the Patent Office.

Signed and sealed this 31st day of December, A. D., 1912.

[SEAL.]

C. C. BILLINGS,

*Acting Commissioner of Patents.* consists in first steeping the fruit and removing the solubles dissolved out by the steeping process, then cooking the fruit and using the resultant liquor for making the jelly.

7. The method of separately removing from apples the substances having cider making properties and those having jellying properties, which consists in first steeping the fruit at a temperature not substantially in excess of one hundred and sixty degrees Fahrenheit and removing the solubles released at this temperature, and then cooking the residue at a temperature of two hundred and twelve degrees Fahrenheit or above.

8. A method of separately removing from apples a substance having cider making properties and those having jellying properties which consists in first steeping the fruit and removing the solubles released at a low temperature and then cooking the residue at a temperature of two hundred and twelve degrees or above.

FREDRICK LESTER JEFFERIES.

Witnesses:
W. S. UNTHANK,
F. M. SAYRE.

---

Correction in Letters Patent No. 1,045,849.

It is hereby certified that in Letters Patent No. 1,045,849, granted December 3, 1912, upon the application of Fredrick Lester Jefferies, of Granite City, Illinois, for an improvement in "Apple Jelly and Methods of Making the Same," an error appears in the printed specification requiring correction as follows: Page 1, line 87, for the word "of" read *not;* and that the said Letters Patent should be read with this correction therein that the same may conform to the record of the case in the Patent Office.

Signed and sealed this 31st day of December, A. D., 1912.

[SEAL.]
C. C. BILLINGS,
*Acting Commissioner of Patents.*

It is hereby certified that in Letters Patent No. 1,045,849, granted December 3, 1912, upon the application of Fredrick Lester Jefferies, of Granite City, Illinois, for an improvement in "Apple Jelly and Methods of Making the Same," an error appears in the printed specification requiring correction as follows: Page 1, line 87, for the word "of" read *not;* and that the said Letters Patent should be read with this correction therein that the same may conform to the record of the case in the Patent Office.

Signed and sealed this 31st day of December, A. D., 1912.

[SEAL.]

C. C. BILLINGS,
*Acting Commissioner of Patents.*